May 27, 1930. M. AURIG 1,760,623
APPARATUS FOR TREATING GASES
Filed April 29, 1929
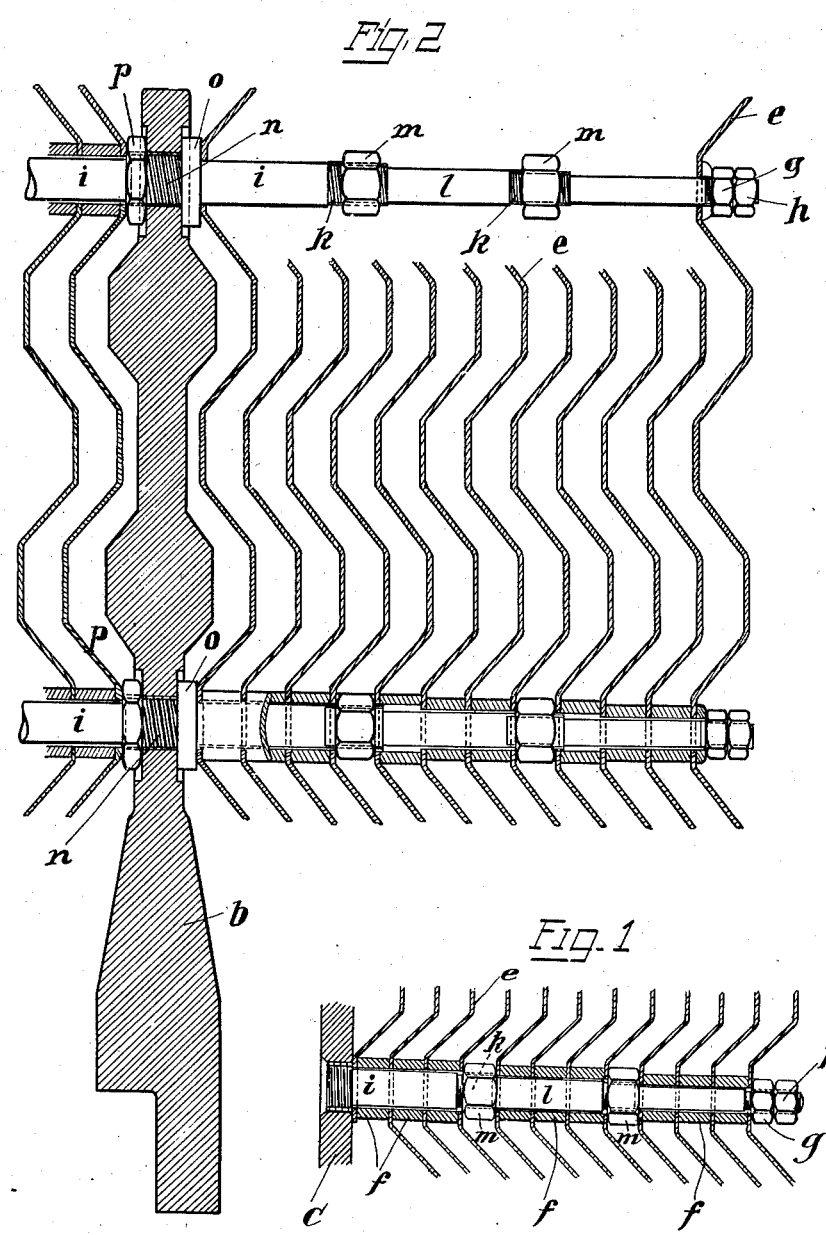
Max Aurig
INVENTOR;
By (signature)
his Attorney.

Patented May 27, 1930

1,760,623

UNITED STATES PATENT OFFICE

MAX AURIG, OF MUNICH, GERMANY

APPARATUS FOR TREATING GASES

Application filed April 29, 1929, Serial No. 358,997, and in Germany February 26, 1929.

My invention relates to improvements in apparatus for purifying, cooling, mixing and absorbing gases, steam, etc., and the type of apparatus to which my invention is particularly directed comprises a series of spaced sinusoidal plates carried by bars or rods which are supported by rotary discs in the apparatus casing.

The principal object of my invention is to provide improved means for retaining the plates in proper position on their supporting bars. Other objects will appear hereinafter. In the accompanying drawings, Fig. 1 is a fragmentary sectional view showing my improved mounting for the plates and Fig. 2 is a similar view of a modification.

The general type of device to which my invention is particularly applicable is one in which a main shaft carries a disc which rotates in the apparatus casing. Secured to opposite faces of the disc are rings which serve as bearings for one end of cylindrical bars or rods upon which sinusoidal plates are carried and maintained in spaced relation by spacers or sleeves. The ends of the rods opposite the rings are threaded to receive nuts for holding the assembly of plates together on the rods. Lock nuts are usually screwed home against the nuts, above mentioned, to prevent loosening of the latter.

It developed in practice that, owing to the very considerable length of the rods and the large number of spaced plates carried thereby, it was impossible to uniformly tighten the plates merely by means of nuts screwed onto threads at one end of the rods. This impossibility to uniformly tighten the plates is due to the fact that the several plates and spacers are not generally uniform nor are the cross sections of the plates and spacers uniform at the parts where pressure from the nuts is applied. The consequence is that greater pressure is applied at some of these parts than at others and as this is true of the entire series, usually eight, of the bars arranged annularly, there is a tendency to buckling or distortion which causes knocking of the rotor because of its lack of proper balance.

A possible remedy for this difficulty might lie in threading the rods throughout their length and applying nuts at intervals, but this expedient is not practicable because as each nut would necessarily be moved from the outermost end of the rod to a point at or near its inner end and vice versa, the thread on the rod would soon wear or strip, and moreover the assembly and disassembly of parts would be expensive.

According to my invention, each bar or rod is provided with or composed of alternately threaded and unthreaded sections, the preferred construction being one in which the unthreaded sections are cylindrical and the diameter of the several sections decreases progressively, from the inner to the outer end of the rod to enable the nuts intended for intermediate parts of the rod to readily pass over previous sections.

Referring to Fig. 1, which illustrates the improved rod arrangement just outlined, $i$ is the innermost unthreaded cylindrical section of the greatest diameter, succeeding which is the offset threaded part or section $k$ of next smaller diameter, then follows another offset unthreaded section $l$ of smaller diameter than $k$ and this arrangement continues throughout the length of the rod. The usual spacers $f$ are interposed between certain of the adjacent plates $e$ and nuts $m$ engaging the threads $k$ serve the double function of spacers and securing means for certain of the other plates. At the outer end of the rod are the nuts $g$ and $h$.

In Fig. 2 I have shown a somewhat modified form wherein each rod comprises alternate threaded and unthreaded areas, but the middle portion of the rod is provided with a thread $n$ which, in lieu of engaging a ring $c$ as in Fig. 1, engages directly with a suitable thread in the disc $b$ carried by the shaft $a$. Obviously, the threaded part $n$ must be of greater diameter than the adjacent innermost unthreaded sections $i$ of the rod. At one side of the thread is a collar or shoulder $o$ and at the other a nut $p$ by which means the rod is securely held in position on the disc $b$.

By the construction of Fig. 2, in which the collar $o$ and nut $p$ project beyond the plane of the contiguous surfaces of the disc $b$, the advantage is obtained that between the innermost plate and the disc $b$ a space is formed which may be used for washing purposes. If the innermost plate $e$ were to lie against the disc $b$, and if there were any inequalities in the plate at the area of contact with the disc, a space between the two might form into which washing tar could find its way. During cessation of operation this tar would solidify and cause knocking of the rotor. By initially providing a space between the innermost plate and the disc, uniform action of the materials in this part of the machine is assured and deposit and incrustation of tar or other substances prevented.

I claim:

1. An apparatus for the purpose specified, comprising a bar adapted to be rotated in a casing, said bar having alternate threaded and unthreaded surfaces, plates spaced from each other and mounted on said bar and means engaging the threaded surfaces for retaining the plates in position on the bar.

2. An apparatus for the purpose specified, comprising a bar adapted to be rotated in a casing, said bar having alternate cylindrical unthreaded and threaded portions of different diameters, spaced plates on said bar and means engageable with the threaded portions thereof to retain the plates in position.

3. An apparatus for the purpose specified, comprising a bar adapted to be rotated in a casing said bar having alternate cylindrical unthreaded and threaded portions of progressively decreasing diameter from the interior of the casing outwardly, plates carried by the bar, spacers between the plates on the unthreaded portions of the bar and nuts between the plates on the threaded portions of the bar and engageable with said threaded portions.

4. An apparatus for the purpose specified, comprising a disc rotatable in a casing, a bar having an intermediate thread traversing said disc, a series of plates spaced from one another and secured on said bar and means at opposite sides of said thread to secure the bar to the disc and to hold the plates next adjacent to the disc spaced from said disc.

5. An apparatus for the purpose specified, comprising a disc rotatable in a casing, a bar having an intermediate thread traversing said disc, said bar also having alternate unthreaded and threaded portions progressively decreasing in diameter from the interior of the casing outwardly in both directions, plates carried by the bar, spacers between the plates on the unthreaded portions of the bar, nuts between the plates on the threaded portions of the bar and engageable with said threaded portions, a collar at one end of the intermediate thread and adapted to space the plate adjacent thereto away from one face of the disc and a nut at the other end of the intermediate thread and adapted to space the plate adjacent said nut from the opposite face of the disc.

In testimony whereof I have affixed my signature.

MAX AURIG.